(12) United States Patent
Burns et al.

(10) Patent No.: US 7,080,854 B2
(45) Date of Patent: Jul. 25, 2006

(54) PYROTECHNIC LINEAR INFLATOR

(75) Inventors: Sean P. Burns, Almont, MI (US);
Bruace A. Stevens, Oakland, MI (US);
Eduardo L. Quioc, Westland, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/034,892

(22) Filed: Jan. 12, 2005

(65) Prior Publication Data

US 2005/0151358 A1 Jul. 14, 2005

Related U.S. Application Data

(60) Provisional application No. 60/536,134, filed on Jan. 13, 2004.

(51) Int. Cl.
*B60R 21/264* (2006.01)

(52) U.S. Cl. ..................................................... 280/741

(58) Field of Classification Search ................ 280/736, 280/741, 740, 742; 102/530, 531
See application file for complete search history.

(56) References Cited

U.S. PATENT DOCUMENTS

| | | | |
|---|---|---|---|
| 3,397,639 | A | 8/1968 | Alderfer |
| 3,606,377 | A | 9/1971 | Martin |
| 3,721,456 | A | 3/1973 | McDonald |
| 3,733,088 | A | 5/1973 | Stephenson |
| 3,799,573 | A | 3/1974 | McDonald |
| 3,897,961 | A | 8/1975 | Leising et al. |
| 3,904,221 | A | 9/1975 | Shiki et al. |
| 3,929,074 | A | 12/1975 | San Miguel |
| 3,986,808 | A | 10/1976 | Keith |
| 4,005,876 | A | 2/1977 | Jorgensen et al. |
| 4,012,211 | A | 3/1977 | Goetz |
| 4,200,615 | A * | 4/1980 | Hamilton et al. ........... 280/736 |

(Continued)

FOREIGN PATENT DOCUMENTS

EP 578478 A1 * 1/1994

(Continued)

*Primary Examiner*—David R. Dunn
(74) *Attorney, Agent, or Firm*—L. C. Begin & Associates, PLLC (57) ABSTRACT

An inflator (10) for use in an inflatable vehicle occupant protection system. In one aspect of the invention, the inflator (10) includes a longitudinal enclosure (22) having a substantially uniform cross-sectional area along at least a portion of the enclosure, and a gas generant composition (24) positioned along the portion of the enclosure (22). The gas generant composition (24) is distributed substantially uniformly along the portion of the enclosure (22). A plurality of gas exit apertures (40) is formed along the portion of the enclosure (22) to enable fluid communication between the enclosure (22) and an exterior of the enclosure. The apertures (40) are spaced apart a distance proportional to a desired rate of propagation of a combustion reaction of gas generant positioned between the apertures (40). In another aspect of the invention, the inflator (10) includes a longitudinal enclosure (22) having a substantially uniform cross-sectional area along at least a portion of the enclosure, and a gas generant composition (24) positioned along the portion of the enclosure (22). The gas generant composition (24) is distributed substantially uniformly along the portion of the enclosure (22). A plurality of gas exit apertures (40) is formed along the portion of the enclosure (22) to enable fluid communication between the enclosure (22) and an exterior of the enclosure. The total number of apertures (40) along the enclosure (22) is inversely proportional to a desired rate of propagation of a combustion reaction of gas generant positioned between the apertures (40).

17 Claims, 4 Drawing Sheets

U.S. PATENT DOCUMENTS

| | | | |
|---|---|---|---|
| 4,322,385 A | 3/1982 | Goetz et al. | |
| 4,358,998 A | 11/1982 | Schneiter et al. | |
| 4,817,828 A * | 4/1989 | Goetz | 280/736 |
| 4,846,368 A | 7/1989 | Goetz | |
| 4,878,690 A | 11/1989 | Cunningham | |
| 4,890,860 A | 1/1990 | Schneiter | |
| 4,950,458 A * | 8/1990 | Cunningham | 422/164 |
| 5,094,475 A | 3/1992 | Olsson et al. | |
| 5,109,772 A | 5/1992 | Cunningham et al. | |
| 5,139,588 A | 8/1992 | Poole | |
| 5,308,370 A | 5/1994 | Kraft et al. | |
| 5,322,322 A | 6/1994 | Bark et al. | |
| 5,397,544 A * | 3/1995 | Kobari et al. | 280/736 |
| 5,409,259 A | 4/1995 | Cunningham et al. | |
| 5,439,250 A | 8/1995 | Kokeguchi et al. | |
| 5,443,286 A | 8/1995 | Cunningham et al. | |
| 5,462,308 A | 10/1995 | Seki et al. | |
| 5,464,249 A | 11/1995 | Lauritzen et al. | |
| 5,503,079 A | 4/1996 | Kishi et al. | |
| 5,540,154 A | 7/1996 | Wilcox et al. | |
| 5,540,459 A | 7/1996 | Daniel | |
| 5,542,704 A | 8/1996 | Hamilton et al. | |
| 5,547,638 A | 8/1996 | Rink et al. | |
| 5,562,303 A | 10/1996 | Schleicher et al. | |
| 5,573,271 A | 11/1996 | Headley | |
| 5,588,672 A | 12/1996 | Karlow et al. | |
| 5,623,115 A | 4/1997 | Lauritzen et al. | |
| 5,626,360 A | 5/1997 | Lauritzen et al. | |
| 5,635,665 A | 6/1997 | Kishi et al. | |
| 5,743,556 A | 4/1998 | Lindsay et al. | |
| 5,752,715 A * | 5/1998 | Pripps et al. | 280/740 |
| 5,826,904 A * | 10/1998 | Ellis et al. | 280/740 |
| 5,827,996 A | 10/1998 | Yoshida et al. | |
| 5,845,933 A | 12/1998 | Walker et al. | |
| 5,868,424 A | 2/1999 | Hamilton et al. | |
| 5,871,228 A | 2/1999 | Lindsay et al. | |
| 5,944,343 A * | 8/1999 | Vitek et al. | 280/736 |
| 5,967,550 A | 10/1999 | Shirk et al. | |
| 6,019,861 A | 2/2000 | Canterberry et al. | |
| 6,029,994 A | 2/2000 | Perotto et al. | |
| 6,032,979 A | 3/2000 | Mossi et al. | |
| 6,039,820 A | 3/2000 | Hinshaw et al. | |
| 6,051,158 A | 4/2000 | Taylor et al. | |
| 6,056,319 A | 5/2000 | Ruckdeschel et al. | |
| 6,062,143 A | 5/2000 | Grace et al. | |
| 6,077,371 A | 6/2000 | Lundstrom et al. | |
| 6,142,518 A | 11/2000 | Butt et al. | |
| 6,145,876 A | 11/2000 | Hamilton | |
| 6,170,867 B1 | 1/2001 | Rink et al. | |
| 6,176,517 B1 | 1/2001 | Hamilton et al. | |
| 6,177,028 B1 | 1/2001 | Kanda et al. | |
| 6,315,847 B1 | 11/2001 | Lee et al. | |
| 6,347,566 B1 | 2/2002 | Rabotinsky et al. | |
| 6,416,599 B1 | 7/2002 | Yoshikawa et al. | |
| 6,497,429 B1 | 12/2002 | Matsumoto | |
| 6,595,547 B1 | 7/2003 | Smith | |
| 6,601,871 B1 | 8/2003 | Fischer | |
| 6,688,231 B1 | 2/2004 | Herrmann | |
| 6,752,421 B1 | 6/2004 | Khandhadia et al. | |
| 6,755,438 B1 | 6/2004 | Rink et al. | |
| 6,805,377 B1 | 10/2004 | Krupp et al. | |
| 6,846,013 B1 | 1/2005 | Smith | |
| 6,880,853 B1 * | 4/2005 | Watase et al. | 280/741 |
| 2004/0084885 A1 | 5/2004 | Burns et al. | |
| 2005/0104349 A1 | 5/2005 | Stevens | |
| 2005/0116454 A1 | 6/2005 | Stevens | |
| 2005/0200103 A1 | 9/2005 | Burns et al. | |
| 2005/0218637 A1 | 10/2005 | Burns | |
| 2005/0218638 A1 | 10/2005 | Burns et al. | |
| 2006/0022444 A1 | 2/2006 | Khandhadia | |

FOREIGN PATENT DOCUMENTS

| | | |
|---|---|---|
| JP | 5-64015 | 8/1993 |

\* cited by examiner

PYROTECHNIC LINEAR INFLATOR

CROSS REFERENCE TO RELATED APPLICATIONS

This application claims the benefit of provisional application Ser. No. 60/536,134 filed on Jan. 13, 2004.

BACKGROUND OF THE INVENTION

The present invention relates to inflators for vehicle airbags and, more particularly, to a linear inflator which discharges inflation gas along the length of the inflator for use in side impact or head curtain airbag systems. In inflation systems for deploying an air bag in a motor vehicle, it is desirable to be able to modify an inflation profile produced by a given inflator design without substantial modifications to the design, in order to accommodate different desired airbag inflation profiles. One method of varying the inflation profile is to modify the composition, amount, and/or physical arrangement of gas generant in the inflator. However, this method of varying the inflation profile may entail relatively complex changes to the inflator design and components, and may also add to inflator manufacturing cost and complexity.

SUMMARY OF THE INVENTION

An inflator construction is provided for use in an inflatable vehicle occupant protection system. In one aspect of the invention, the inflator includes a longitudinal enclosure having a substantially uniform cross-sectional area along at least a portion of the enclosure, and a gas generant composition positioned along at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The apertures of the first plurality of gas exit apertures are spaced apart a distance proportional to a desired rate of propagation of a combustion reaction of gas generant positioned between the apertures.

In another aspect of the invention, the inflator includes a longitudinal enclosure having a substantially uniform cross-sectional area along at least a portion of the enclosure, and a gas generant composition positioned along the at least a portion of the enclosure. The gas generant composition is distributed substantially uniformly along the at least a portion of the enclosure. A first plurality of gas exit apertures is formed along the at least a portion of the enclosure to enable fluid communication between the enclosure and an exterior of the enclosure. The number of apertures in the first plurality of gas exit apertures is inversely proportional to a desired rate of propagation of a combustion reaction of gas generant positioned between the apertures.

BRIEF DESCRIPTION OF THE DRAWINGS

In the drawings illustrating embodiments of the present invention:

FIG. 2 and FIG. 3 are graphical representations of respective airbag inflation pressures provided by activation of various embodiments of the present invention.

DETAILED DESCRIPTION

Figure 1:
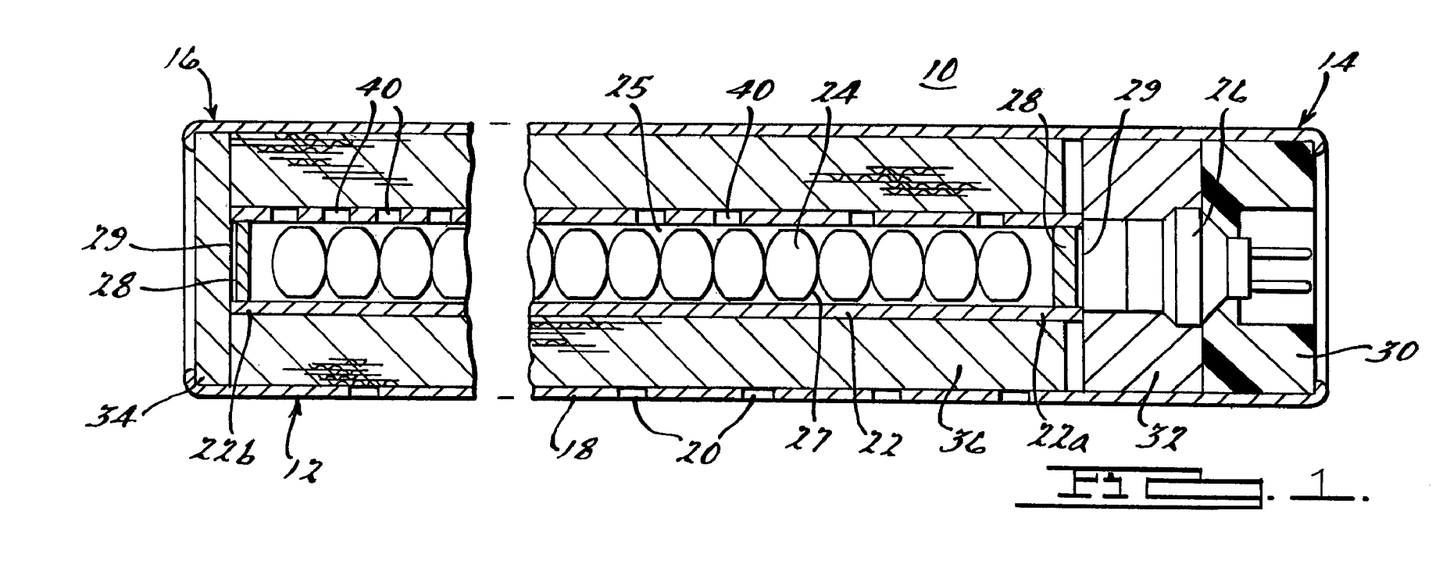
FIG. 1 is a cross-sectional side view showing the general structure of an inflator in accordance with the present invention.

FIG. 1 shows a cross-sectional view of an inflator 10 in accordance with the present invention. Inflator 10 is preferably constructed of components made from a durable metal such as carbon steel or iron, but may also include components made from tough and impact-resistant polymers, for example. One of ordinary skill in the art will appreciate various methods of construction for the various components of the inflator. U.S. Pat. Nos. 5,035,757, 6,062, 143, 6,347,566, U.S. Patent Application Serial No. 2001/0045735, WO 01/08936, and WO 01/08937 exemplify typical designs for the various inflator components, and are incorporated herein by reference in their entirety, but not by way of limitation.

Referring to FIG. 1, inflator 10 includes a tubular housing 12 having a pair of opposed ends 14, 16 and a housing wall 18. Housing 12 may be cast, stamped, extruded, or otherwise metal-formed. A plurality of gas exit apertures 20 are formed along housing wall 18 to permit fluid communication between an interior of the housing and an airbag (not shown).

A longitudinal gas generant enclosure 22 is inwardly radially spaced from housing 12 and is coaxially oriented along a longitudinal axis of the housing. Enclosure 22 has an elongate, substantially cylindrical body defining a first end 22a, a second end 22b, and an interior cavity for containing a gas generant composition 24 therein. Enclosure first end 22a is positioned to enable fluid communication between an igniter 26 and the enclosure interior cavity. Enclosure 22 is configured to facilitate propagation of a combustion reaction of gas generant 24 along the enclosure, in a manner described in greater detail below.

A plurality of gas generant tablets 24 are stacked side by side along the length of enclosure 22. Each tablet 24 has substantially the same dimensions. In one embodiment, each gas generant tablet 24 has an outer diameter of ¼" and a pair of opposing, generally dome-shaped faces 27, providing a maximum tablet width of approximately 0.165" between faces. As seen in FIG. 1, tablets 24 are shaped or configured to advantageously create a cavity 25 between adjacent tablets 24. These cavities 25 provide a volume of air space relative within enclosure 22, thereby enhancing the burn characteristics of tablets 24 when they are ignited. An alternative arrangement of the gas generant along the length of the enclosure may be provided. However, any arrangement of gas generant along the enclosure preferably provides a substantially uniform average distribution of gas generant along the length of the enclosure. Examples of gas generant compositions suitable for use in the present invention are disclosed in U.S. Pat. Nos. 5,035,757, 6,210,505, and 5,872,329, incorporated herein by reference. However, the range of suitable gas generants is not limited to those described in the cited patents.

A quantity of a known auto-ignition composition 28 is positioned at either end of the stack of gas generant material 24. Enclosure 22 is environmentally sealed at both ends with an aluminum tape 29 or any other effective seal.

An igniter 26 is secured to inflator 10 such that the igniter is in communication with an interior of gas generant enclosure 22, for activating the inflator upon occurrence of a crash event. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. First endcap 32 also provides a closure for gas generant enclosure 22. A second endcap 34 is crimped or otherwise fixed to a second end 16 of housing 12. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the inflator design for filtering particulates from gases generated by combustion of gas generant 24. In general, filter 36 is positioned between gas generant 24 and apertures 20 formed along inflator housing wall 18. In the embodiment shown in FIG. 1, filter 36 is positioned exterior of gas generant enclosure 22 intermediate enclosure 22 and housing wall 18, and substantially occupies the annular space between gas generant enclosure 22 and housing wall 18. In an alternative embodiment (not shown), filter 36 is positioned in the interior cavity of enclosure 22 between gas generant 14 and enclosure gas exit apertures 40 formed along enclosure 22. The filter may be formed from one of a variety of materials (for example, a carbon fiber mesh or sheet) known in the art for filtering gas generant combustion products.

In accordance with the present invention, a plurality of gas exit apertures 40 is particularly formed along enclosure 22 to tailor the rate of propagation of a combustion reaction of the gas generant 24 along the enclosure, as required by design criteria. Apertures 40 are spaced apart along enclosure 22 as described in greater detail below. Enclosure 22 may be roll formed from sheet metal and then perforated to produce apertures 40. Enclosure apertures 40 are environmentally sealed with an aluminum tape (not shown) or any other effective seal.

The effects of the sizes of enclosure apertures 40 and the spacing between the apertures on combustion propagation were studied by constructing a number of inflators substantially as shown in FIG. 1. Multiple groups of apertures 40 were formed along each enclosure 22, with the sizes and spacing of the apertures varying in a predetermined manner within each group as described below, beginning at the end of inflator 10 proximate igniter 26.

EXAMPLE 1

A first group of 23 apertures having a 4.0 mm diameter and spaced one inch on center (OC) was first linearly formed, and then a second group of 48 apertures having a 4.0 mm diameter and spaced ½" OC were formed collinear with the first group of apertures.

EXAMPLE 2

A first group of 16 apertures having a 4.0 mm diameter and spaced one inch on center (OC) were first linearly formed; next a second group of 51 apertures having a 4.0 mm diameter and spaced ½" OC were formed collinear with the first group of apertures; and finally a third group of 20 apertures having a 5.0 mm diameter and spaced ¼" OC were formed collinear with the first and second groups of apertures.

EXAMPLE 3

A first group of 12 apertures having a 4.0 mm diameter and spaced one inch on center (OC) were first linearly formed; next a second group of 47 apertures having a 4.0 mm diameter and spaced ½" OC were formed collinear with the first group of apertures; and finally a third group of 45 apertures having a 5.0 mm diameter and spaced ¼" OC were formed collinear with the first and second groups of apertures.

EXAMPLE 4

A first group of 12 apertures having a 4.0 mm diameter and spaced one inch on center (OC) were first linearly formed; next a second group of 23 apertures having a 4.0 mm diameter and spaced ½" OC were formed collinear with the first group of apertures; and finally a third group of 91 apertures having a 5.0 mm diameter and spaced ¼" OC were formed collinear with the first and second groups of apertures.

The term "on center" is defined to be from the center point of one orifice to the center point of an adjacent orifice. The size of the holes or gas exit apertures preferably ranges from about one millimeter to about one-half the diameter of the propellant tube. Holes smaller than one millimeter are often difficult to manufacture with consistent size and with the desired efficiency. Holes or gas exit apertures larger than half the diameter of the propellant tube weaken the structure of the tube and are therefore relatively difficult to produce.

The gas exit apertures are preferably spaced about six millimeters to 26 millimeters on center. A spacing less than about 6 mm may weaken the structure, and presents a further structural concern if the local or associated gas exit aperture size is relatively large or close to the diameter of the propellant tube. Spacing larger than 26 mm may be employed although the efficiency of the cooling screen may consequently be reduced.

As such, the present invention incorporates a tailored overall orifice or aperture area dependent on both the size and spacing of the gas exit apertures. The overall aperture area may be tailored based on various design criteria such as the composition of the gas generant and/or the desired inflation profile of an associated airbag, for example. The distribution of the overall aperture area from a relatively lower aperture area within the first half of the propellant tube (that is the half closest or adjacent to the ignition source) to a relatively larger aperture area within the second half of the propellant tube (that is the half of the propellant tube farthest from the ignition source) provides the desired combustion propagation across the length of the tube.

The percentage of the total aperture area as a function of the position of the holes from the ignition source is tabulated and exemplified below. The open area is defined as the sum of the area of each hole in the propellant tube. Starting with a known example of equally spaced holes of equal size, the orifice area is equally distributed throughout the length of the propellant tube. This results in the fastest propagation time and the shortest burnout time, or, the time required to completely combust the gas generant. As shown in Examples 1 through 4, the share of the aperture/orifice area at the ignition end of the tube is relatively smaller while the share of the orifice area at the opposite end of the ignition tube is relatively larger. This causes a proportional increase in the time it takes for the entire propellant stack to ignite and therefore affects the initial combustion rate and the duration of gas generation.

Figure 2:
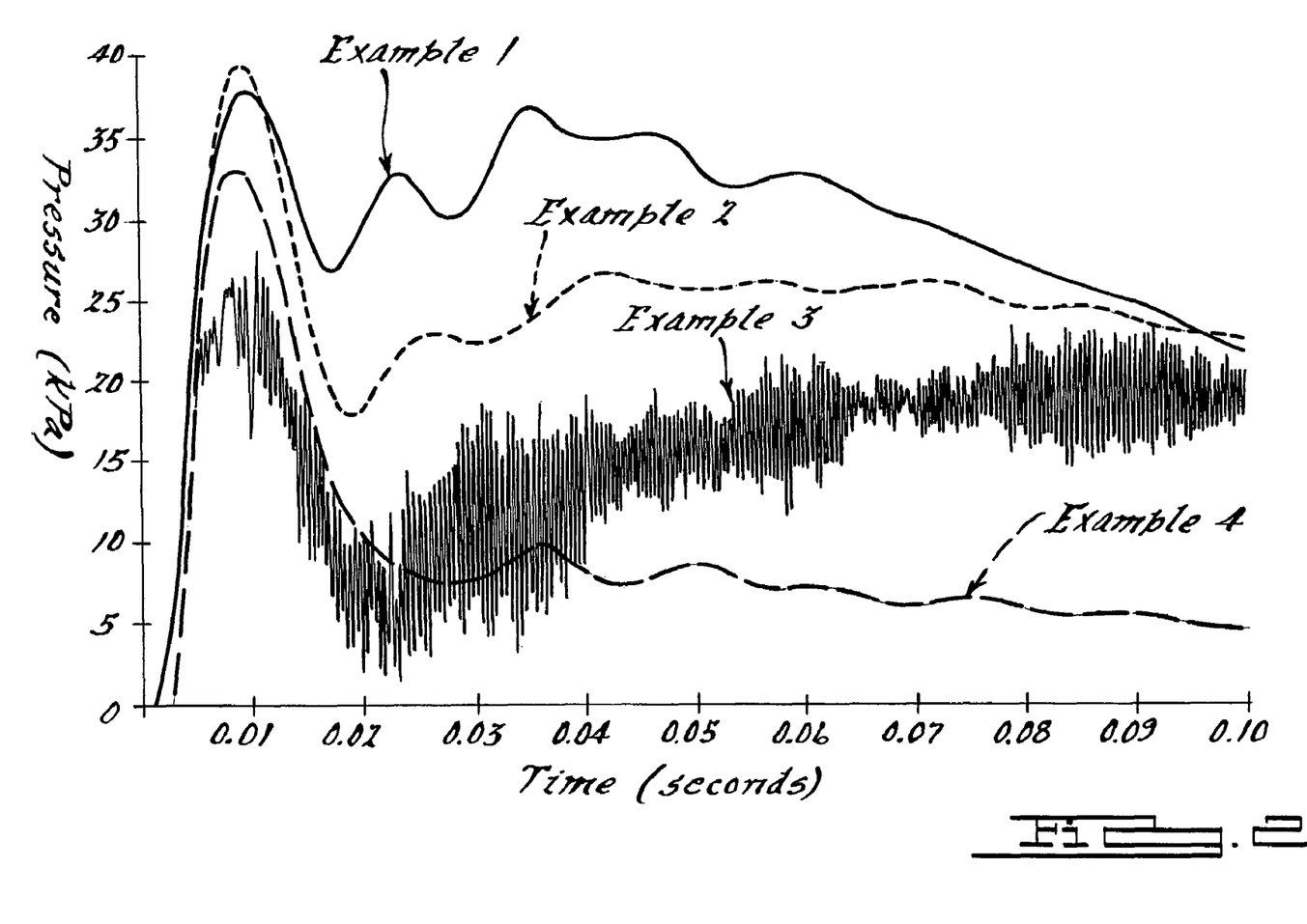

Each of the inflators was then activated, and the resulting airbag inflation pressure measured over the first few seconds of inflation. FIG. 2 graphically represents the resulting airbag inflation pressures during the first 0.1 second after inflator activation. FIG. 3 graphically represents the airbag inflation pressures during the first two seconds after inflator activation.

Based on these measurements and on laboratory analysis, it is believed that after initiator 26 is activated, the propagation rate of the combustion reaction along the enclosure is dependent upon the number of apertures 40 and the spacing between the apertures along enclosure 22. More specifically, it is believed that, along the sections of the enclosure where the aperture spacing is 1" OC, the combustion reaction propagates via hot gases because the pressure inside this portion of the enclosure is relatively high due to the relative shortage of apertures to relieve the pressure; thus, there is a driving pressure force urging the hot gases further down the enclosure. In the sections where the aperture spacing is ½" OC, the combustion reaction still propagates via hot gases but at a slower rate because the internal pressure is relatively lower, due to the shorter distance between apertures. In the sections where the aperture spacing is ¼" OC, apertures 40 are relatively numerous, permitting the enclosure internal pressure to be more easily relieved; thus, there is minimal driving pressure force urging the hot gases further down the length of the enclosure. In this case, the combustion reaction continues to propagate at a relatively slower rate as each tablet 24 ignites the next adjacent tablet as it burns.

Thus, from an analysis of the above examples, it is believed that a relatively greater spacing between enclosure apertures 40 produces a correspondingly greater pressure within enclosure 22, resulting in a more rapid propagation (via hot gases) of the combustion reaction along the portion of the gas generant residing between the spaced-apart apertures. The more rapid propagation of the combustion reaction results in a more rapid burning of the gas generant and, thus, a more rapid generation of inflation gas, and more rapid inflation of an associated airbag, for example. Therefore, to affect the propagation rate of a combustion reaction along a portion of the enclosure, the apertures along the portion of the enclosure may be spaced apart a distance proportional to a desired rate of propagation of a combustion reaction of gas generant positioned between the apertures. The examples therefore illustrate how the combustion propagation rate may be tailored using an appropriate arrangement of enclosure apertures, to accommodate greater or lesser desired airbag inflation rates, and also to accommodate desired shorter or longer inflation durations. It should be appreciated that the type of propellant or gas generant composition 24 employed, for example those described in U.S. Pat. Nos. 5,035,757, 5,872,329, and 6,210,505, each herein incorporated by reference, may also be determinative of the desired combustion propagation rate across the length of the propellant tube 22. Accordingly, the propellant employed will affect the aperture open area along the length of the propellant tube. As different propellants are employed, the "aperture open area/unit length of the propellant tube" may be iteratively determined by experimental methods to produce the desired propagation rate across the length of the enclosure or propellant tube. For example, propellant tubes containing the same propellant could be perforated with different open areas per unit length across the length of the propellant tube in accordance with the present invention, and then qualitatively and quantitatively evaluated for sustained combustion, combustion propagation, inflation profile of an associated airbag, gas generating duration, inflator pressure across the length thereof, and other design criteria.

TABLE

Exemplary Open Area Percentages for Respective Sectional Lengths of the Propellant Tube

|  | First 25% of Prop. Tube Length (closest to initiator end) | Second 25% of Prop. Tube Length | Third 25% of Prop. Tube Length | Fourth 25% of Prop. Tube Length (farthest from initiator end). |
|---|---|---|---|---|
| Equally Spaced and Sized Holes | 25% | 25% | 25% | 25% |
| Example 1 | 17% | 18% | 34% | 31% |
| Example 2 | 12% | 19% | 24% | 44% |
| Example 3 | 9% | 19% | 18% | 54% |
| Example 4 | 7% | 13% | 43% | 37% |

Preferred ranges for the percentage of the total aperture areas of each section of the propellant tube are as follows:

First 25% of Propellant Tube Length (Closest to the Initiator)—about 7–25%

Second 25% of Propellant Tube Length—about 13–25%

Third 25% of Propellant Tube Length—about 18–43%

Fourth 25% of Propellant Tube Length—25–54%

In view of the data given above, the present invention includes a propellant tube 22 having a plurality of gas exit apertures 40 wherein the area of each hole is calculated and a total open aperture area or sum is calculated by adding the gas exit aperture areas together. A first perforated section or portion of the propellant tube 22 is fixed closest to the igniter 26, wherein the first portion includes less than half of the total open aperture area. A second perforated section or portion of the propellant tube 22 is integral to and in coaxial relation with the first portion, wherein the second portion includes more than half of the total open aperture area. The first portion may include up to 75% of the total length of the propellant tube 22, for example. On the other hand, the second portion may include as little as 25% of the total length of the propellant tube 22, for example. It should be appreciated that in a preferred embodiment, the first half of the tube 22 will contain less than half of the total open aperture area, and the second half of the propellant tube 22 will contain more than half of the total open aperture area. As discussed above, the respective first and second gas exit aperture areas of either the first or second sections may be tailored by the number and size of respective gas exit apertures included in either section.

Accordingly, consistent with the table given above, the present invention may also be characterized as an elongated inflator 10 comprising a plurality of collinear and integral sections that together constitute a single perforated tube 22. As such, in this embodiment, a first section nearest to an associated igniter, a second section juxtaposed to the first section, a third section juxtaposed to the second section, and a fourth section farthest from the igniter and juxtaposed to the third section constitute the propellant tube internal to the inflator. More generally, the present invention includes an elongated inflator 10 that contains an elongated propellant tube 22 substantially coextensive therewith. A first end 22a of the propellant tube 22 is fixed to an associated igniter 26. A second end 22b of the propellant tube 22 is preferably capped to seal off the flow of combustion gases upon inflator 10 activation. A plurality of gas exit orifices 40 is formed within the propellant tube 22 from the first end to the second end. As supported in the table shown above relative to overall open aperture area, the number of apertures per unit length of enclosure 22 and the aperture area per unit length of the enclosure increases with each successive group of apertures along the enclosure, proceeding from the first end of the enclosure to the second end of the enclosure It is noted that the stacking of substantially uniform gas generant tablets 24 adjacent each other along enclosure 22 provides for a relatively constant average density of gas generant along the enclosure. Also, the use of an enclosure having a substantially constant cross-sectional area along the length of the enclosure provides for a substantially constant volume per unit length of the enclosure. These features aid in minimizing pressure variations within the enclosure due to such factors as variations in enclosure volume, and localized hot spots and higher pressure regions resulting from disparities in gas generant distribution along the enclosure. The dome-shaped faces of each propellant tablet further facilitates an ease of assembly in that each dome-shaped face provides a pivot point at its apex that physically communicates with the apex of an adjacent tablet's propellant face. Accordingly, by virtue of the pivot point created on each dome-shaped face, the same juxtaposed orientation of each propellant tablet is assured without undue complication.

In addition, it may be seen (particularly from, FIG. 2) tat the airbag pressure measured in each Example decreases markedly from an initial peak value within approximately 0.02 seconds of inflator activation. It may also be seen that the magnitude of the initial pressure drop is relatively smaller forte inflator of Example 1 and relatively greater for the inflator of Example 4. It is believed that the magnitude of this pressure drop is related to the total number of apertures along the respective gas generant enclosure. The gas generant enclosure of Example 1 has a total of 71 apertures formed therealong, while the enclosure of Example 4 has a total of 126 apertures formed therealong. It is believed that the greater number of apertures along the enclosure of Example 4, spaced along a greater length of the respective enclosure, provides a greater total aperture area for relief of enclosure internal pressure. Thus, the greater number of apertures along the gas generant enclosure of Example 4 may serve to reduce the combustion propagation rate relative to the enclosure of Example 1, because of the relatively larger pressure drop in the enclosure. Therefore, to affect the propagation rate of a combustion reaction along a portion of the enclosure, the number of apertures provided along the portion of the enclosure is made inversely proportional to a desired rate of propagation of a combustion reaction along the gas generant positioned between the apertures.

Figure 4:
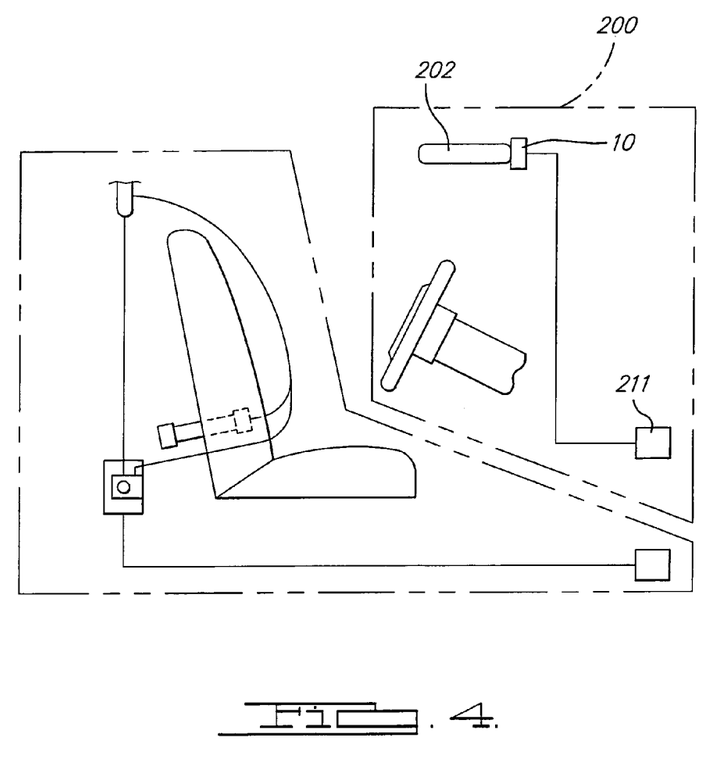
FIG. 4 is a schematic representation of an exemplary vehicle occupant restraint system incorporating an inflator in accordance with the present invention.
Figure 7:
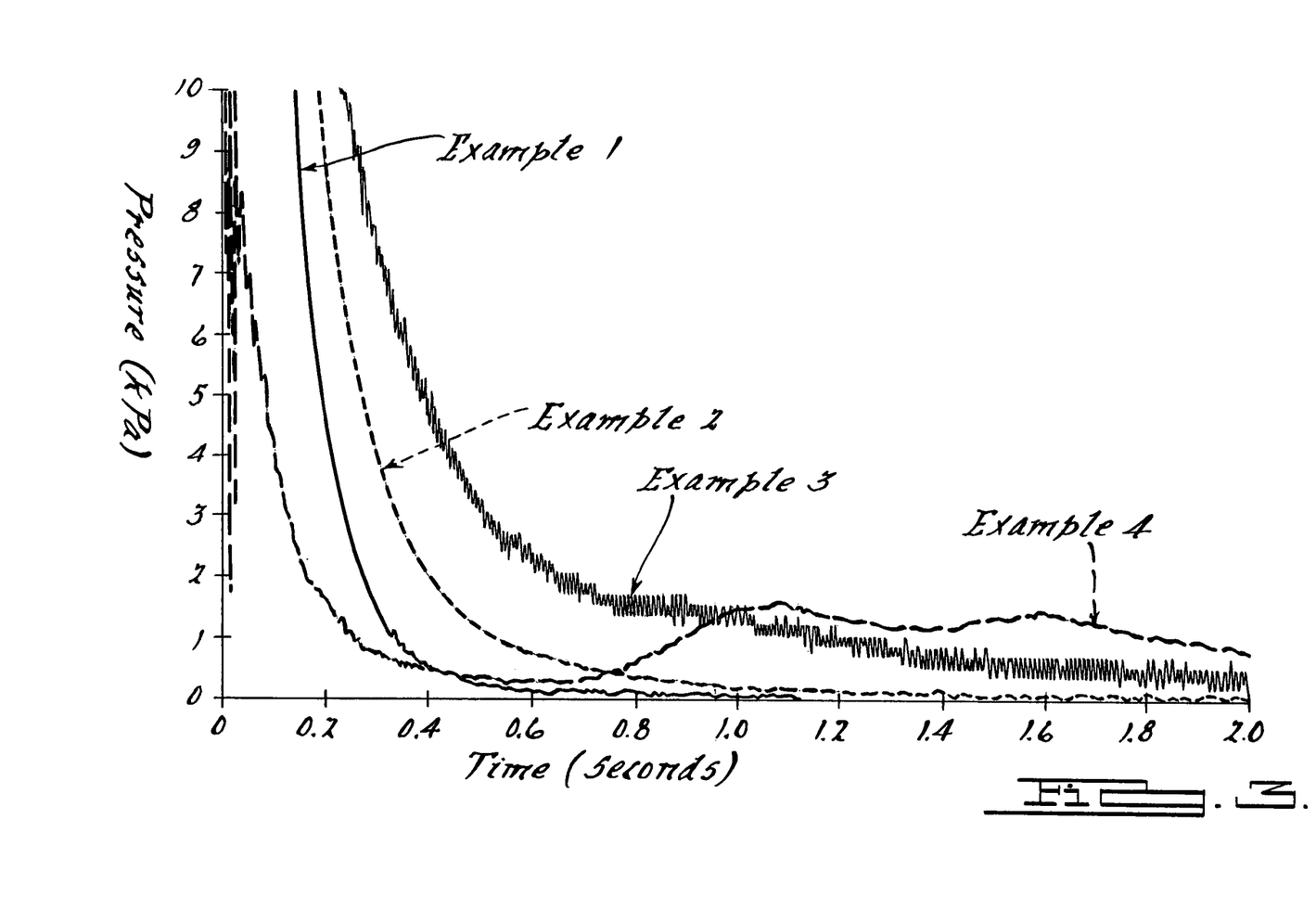

Referring now to FIG. 4, an inflator constructed in accordance with the principles outlined above may be incorporated into a vehicle occupant restraint system 200. Vehicle occupant restraint system 200 includes at least one airbag 202 and an inflator 10 in accordance with the present invention and coupled to airbag 202 so as to enable fluid communication with an interior of the airbag. Vehicle occupant restraint system 200 may be in operative communication with a crash event sensor 211 which communicates with a known crash sensor algorithm that signals actuation of vehicle occupant restraint system 200 via, for example, activation of airbag inflator 10 in the event of a collision.

It should be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

The invention claimed is:

1. An inflator for use in an inflatable vehicle occupant protection system comprising:

a longitudinal tubular enclosure having a substantially uniform cross-sectional area along at least a portion of the enclosure, said longitudinal tubular enclosure having a first tubular perforated section with a first length and a plurality of first gas exit apertures formed therealong, each first gas exit aperture of the plurality of first gas exit apertures having a substantially equal cross-sectional area, said longitudinal tubular enclosure also having a second tubular perforated section formed in collinear relation with said first tubular perforated section, said second tubular perforated section having a second length and a plurality of second gas exit apertures formed therealong, each second gas exit aperture of the plurality of second gas exit apertures having a substantially equal cross-sectional area, said first perforated tubular section containing a first gas exit aperture area per unit length thereof and said second perforated tubular section containing a second gas exit aperture area per unit length thereof, said second gas exit aperture area per unit length being greater than said first gas exit aperture area per unit length;

a gas generant composition positioned within the at least a portion of the enclosure, the gas generant composition being distributed substantially uniformly along the at least a portion of the enclosure; and an igniter operably fixed to said first perforated section for ignition of said gas generant composition upon inflator activation.

2. The inflator of claim 1 wherein the first aperture area per unit length is formed by the plurality of first gas exit apertures being formed along the first tubular perforated section to enable fluid communication between the enclosure and an exterior of the enclosure, adjacent apertures of the first plurality of gas exit apertures being spaced apart a distance proportional to a predetermined rate of combustion propagation of an amount of the gas generant positioned within the enclosure between the adjacent apertures.

3. The inflator of claim 2 wherein the enclosure has an outer diameter, each aperture of the plurality of first gas exit apertures is spaced on center about six millimeters to 26 millimeters from an adjacent gas exit aperture, and wherein each aperture of the plurality of first gas exit apertures is sized from one millimeter to one half the outer diameter of the enclosure.

4. The inflator of claim 2 wherein the gas exit apertures formed along the at least a portion of the enclosure are substantially collinear.

5. The inflator of claim 1 wherein the gas generant composition is in the form of a plurality of adjacent gas generant tablets positioned along the at least a portion of the enclosure and wherein at least a portion of the gas generant tablets each include a pair of opposed dome-shaped faces so as to provide a cavity between adjacent ones of the at least a portion of the gas generant tablets.

6. The inflator of claim 1 wherein each of the first apertures of the plurality of first apertures and each of the second apertures of the plurality of second apertures has a substantially equal cross-sectional area.

7. The inflator of claim 6 wherein a number of apertures in the plurality of second apertures is greater than a number of apertures in the plurality of first apertures.

8. The inflator of claim 6 wherein adjacent first apertures of the plurality of first apertures are spaced apart a first center-to-center distance, adjacent second apertures of the plurality of second apertures are spaced apart a second center-to-center distance, and wherein the first center-to-center distance is greater than the second center-to-center distance.

9. The inflator of claim 1 wherein the second length is greater than the first length.

10. A method for controlling a rate of propagation of a combustion reaction of a gas generant composition along at least a portion of a longitudinal enclosure, comprising the steps of:
   providing a longitudinal enclosure having a substantially uniform cross-sectional area along the at least a portion of the enclosure;
   providing a gas generant composition distributed substantially uniformly along the at least a portion of the enclosure;
   providing a first tubular performed section along the at least a portion of the enclosure, the first tubular perforated section including a plurality of first gas exit apertures longitudinally spaced apart therealong to enable fluid communication between an interior of the enclosure and an exterior of the enclosure, a distance between each first gas exit aperture and an adjacent first gas exit aperture being controlled such that the distance is proportional to a predetermined rate of propagation of a combustion reaction of an amount of the gas generant composition positioned within the enclosure between the first gas exit aperture and the adjacent first gas exit aperture, thereby varying the rate of propagation of the combustion reaction along the first tubular perforated section in correspondence with the distances between adjacent ones of the plurality of first gas exit apertures.

11. The method of claim 10 wherein the step of providing a first tubular perforated section including a plurality of first gas exit apertures comprises the step of spacing apart the apertures of the plurality of first gas exit apertures substantially evenly along the first tubular perforated section.

12. The method of claim 11 further comprising the steps of:
   providing a second tubular perforated section along the at least a portion of the enclosure, the second tubular perforated section being formed in collinear relation with the first tubular perforated section, the second tubular perforated section including a plurality of second gas exit apertures longitudinally spaced apart therealong to enable fluid communication between an interior of the enclosure and an exterior of the enclosure, a distance between each gas exit aperture and an adjacent gas exit aperture being controlled such that the distance is proportional to a predetermined rate of propagation of a combustion reaction of an amount of the gas generant composition positioned within the enclosure between the gas exit aperture and the adjacent gas exit aperture, thereby varying the rate of propagation of the combustion reaction along the second tubular perforated section in correspondence with the distances between adjacent ones of the plurality of second gas exit apertures.

13. The method of claim 12 wherein the step of providing a second tubular perforated section including a plurality of second gas exit apertures comprises the step of spacing apart the apertures of the plurality of second gas exit apertures substantially evenly along the second tubular perforated section.

14. The method of claim 12 wherein the step of providing a second tubular perforated section including a plurality of second gas exit apertures comprises the step of collinearly positioning the second gas exit apertures of the plurality of second gas exit apertures.

15. The method of claim 10 wherein the step of providing a first tubular perforated section including a plurality of first gas exit apertures comprises the step of collinearly positioning the first gas exit apertures of the plurality of first gas exit apertures.

16. An inflator manufactured according to the method of claim 10.

17. A vehicle occupant restraint system comprising:
   an airbag system having at least one airbag and an inflator coupled to the airbag so as to enable fluid communication with an interior of the airbag upon activation of the inflator, the inflator including:
   a longitudinal tubular enclosure having a substantially uniform cross-sectional area along at least a portion of the enclosure, said longitudinal tubular enclosure having a first tubular perforated section with a first length and a plurality of first apertures formed therealong, each first gas exit aperture of the plurality of first gas exit apertures having a substantially equal cross-sectional area, said longitudinal tubular enclosure also having a second tubular perforated section formed in collinear relation with said first tubular perforated section, said second tubular perforated section having a second length and a plurality of second apertures formed therealong, each second gas aperture of the plurality of second apertures having a substantially equal cross-sectional area,
   said first perforated tubular section containing a first gas exit aperture area per unit length thereof and said second perforated tubular section containing a second gas exit aperture area per unit length thereof, said second gas exit aperture area per unit length being greater than said first gas exit aperture area per unit length;
   a gas generant composition positioned within the at least a portion of the enclosure, the gas generant composition being distributed substantially uniformly along the at least a portion of the enclosure; and
   an igniter operably fixed to said first perforated section for ignition of said gas generant composition upon inflator activation.

* * * * *